United States Patent [19]

Otken et al.

[11] 4,122,570

[45] Oct. 31, 1978

[54] CULTIVATING SYSTEM

[76] Inventors: Francis P. Otken, 6611 Joliet Dr., Lubbock, Tex. 79413; Henry L. Otken, 134 McGehee Dr., Baton Rouge, La. 70815

[21] Appl. No.: 775,376

[22] Filed: Mar. 7, 1977

[51] Int. Cl.² ............................................. B25F 1/02
[52] U.S. Cl. ...................................... 7/114; 172/376
[58] Field of Search ................ 7/1 L, 114; 56/400.04, 56/400.05, 400.07; 172/374, 375, 376; 294/49, 51, 59

[56] References Cited

U.S. PATENT DOCUMENTS

| | | | |
|---|---|---|---|
| 1,352,386 | 9/1920 | Rundberg | 56/400.07 X |
| 1,374,051 | 4/1921 | Anderson | 172/376 |
| 1,885,089 | 10/1932 | Dukes | 7/1 L |
| 2,665,434 | 1/1954 | Saunders | 7/1 L |
| 3,868,775 | 3/1975 | Anderson | 172/375 X |

Primary Examiner—James L. Jones, Jr.
Assistant Examiner—James G. Smith
Attorney, Agent, or Firm—Richards, Harris & Medlock

[57] ABSTRACT

The specification discloses a tool used for chopping and scraping earth which is easily convertible into numerous different implements such as a rake, shovel, broom, fork or the like. An apertured working section is disposed normally to an elongated handle. Two intersecting planar cutting surfaces are integrally formed and extend along the base of the working section in order to define a cutting edge which enables the tool to be used for cutting soil. The aperture formed through the working section permits the passage of earth therethrough to facilitate scraping of soil. The working section contains several smaller apertures to which any of a variety of attachments can be bolted when it is desirable to use the tool for some function other than chopping or scraping earth.

14 Claims, 10 Drawing Figures

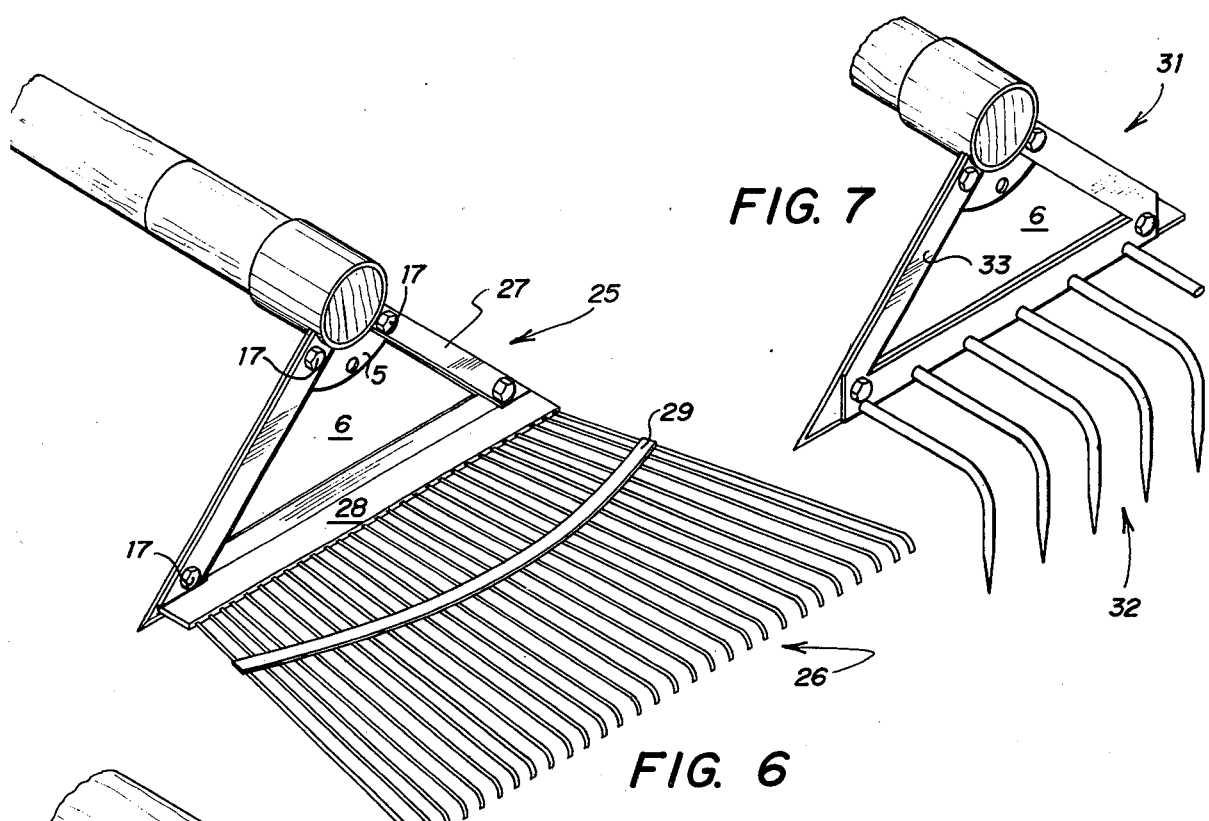
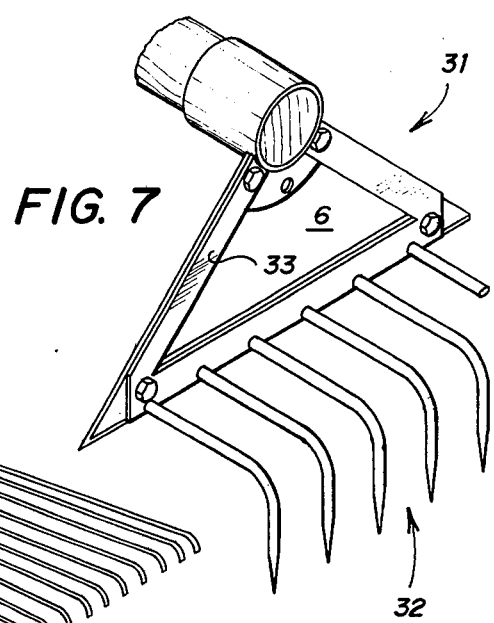
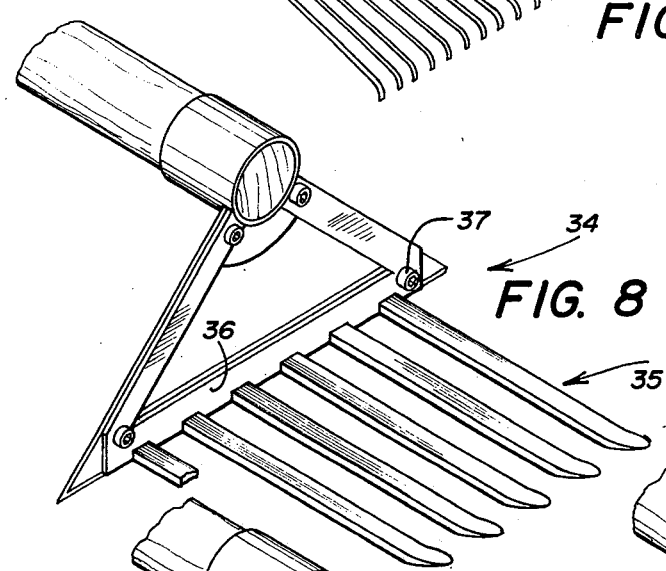
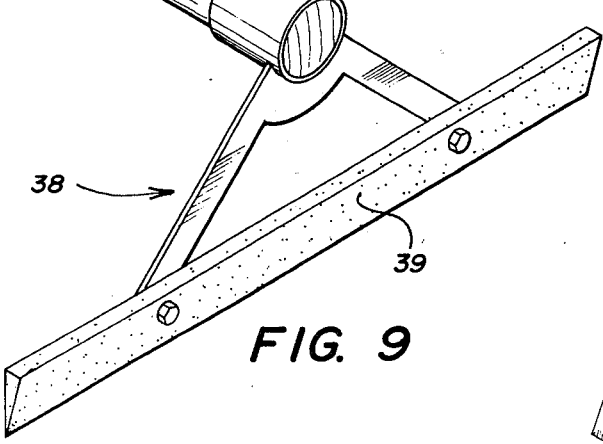
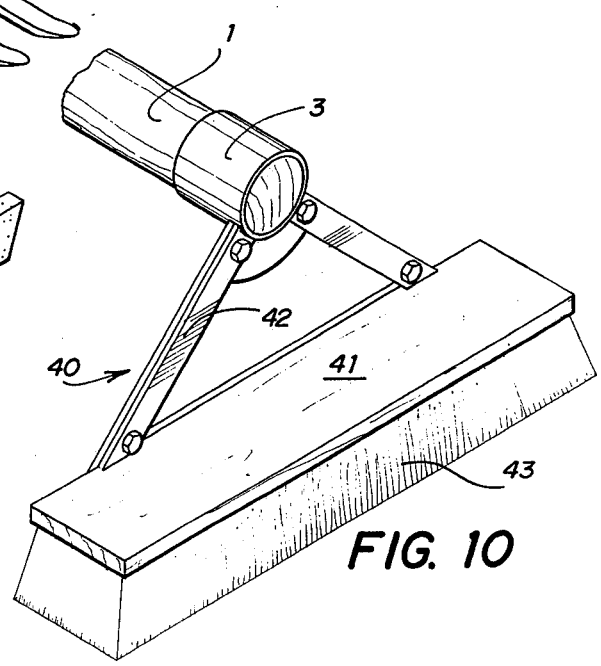

CULTIVATING SYSTEM

FIELD OF THE INVENTION

This invention relates to implements, and more particularly to a tool for chopping and scraping the soil which is also convertible into other hand tools.

DESCRIPTION OF THE PRIOR ART

In agriculture, a wide variety of hand tools are commonly used by the farmer in cultivation, planting, weeding and in the performance of other jobs on the farm. The number of different tools needed to perform these functions, coupled with the fact that the farmer is often required to carry many different tools considerable distances to the place where they will be used, makes it desirable to find ways of constructing hand tool implements whereby one tool can be used to perform more than one task.

The chopping, breaking and cutting of earth is one of the most important tasks in farming, especially in the preparation of soil for planting. The ordinary hoe is commonly used for chopping the soil. The hoe also performs another important task, the scraping and turning of soil. As a scraping implement, however, the hoe is somewhat inefficient because the flat side applied against the earth exerts considerable drag resistance. More efficient implements for scraping soil, especially for scraping subsoil, with minimal disturbance to topsoil, have thus been heretofore devised.

Devices such as those disclosed in U.S. Pat. No. 1,374,051, issued to Anderson, Apr. 5, 1921; U.S. Pat. No. 1,591,280, issued to Carr, July 6, 1926; U.S. Pat. No. 1,639,643, issued to Arvedson, Aug. 23, 1927; U.S. Pat. No. 2,943,690, issued to Towt, July 5, 1960, and the "Improved Hoe" manufactured by Ames Corporation of Parkersburg, West Virginia, are designed to facilitate the scraping of soil, especially subsoil, by providing an apertured head to permit the passage of soil therethrough. While these devices exemplify more efficient means of scraping soil, they are not designed to cut or chop the soil as well. In particular, such prior art apertured scraping devices have not been equipped with cutting edges which are applied more or less perpendicular to the soil to break it. Moreover, the heads of such prior scraping devices often lack sufficient structural integrity to sustain continued application to the soil with the impact necessary to cut or chop the soil.

Accordingly, a need has arisen for a cultivation implement capable of performing the cutting and chopping functions of the common hoe, but which can also scrape the soil with reduced drag resistance and with less disturbance of the topsoil. The present invention has been designed to efficiently perform both functions.

It has been heretofore known to modify tool implements in order to perform different but related functions. However, none of the prior art devices disclose an improved apertured hoe for chopping and scraping which is easily modified to receive a panoply of attachable implements such as rakes, shovels, forks, cultivators, brooms, squeegees, cutting blades and the like. An obvious advantage of this aspect of the invention is economy as the present invention enables a farmer to replace a large set of agricultural implements with a single cultivation system. The present technique is thus less costly than maintaining a large tool inventory and facilitates the transportation of a wide variety of necessary tools to the location where they will be used.

SUMMARY OF THE INVENTION

The present invention is directed to multifunctional hand tools which are easily modified to receive attachments to perform further functions. The present invention is useful for chopping and cutting soil, as well as scraping thereof, with greater facility than with an ordinary hoe. By receiving removable attachments, the present hoe invention adapts to other uses, such as rakes, shovels, and the like.

In accordance with the present invention, an improved hoe useful for scraping and chopping has a head dimensioned to receive an elongated handle. The head includes a working section disposed normally to the length of the handle and having the shape of a truncated isosceles triangle. An aperture having boundaries geometrically similar in shape to the outer periphery of the working section is formed through the working section. The aperture is sufficiently wide to permit the passage of earth therethrough when the hoe is used for scraping. The hoe contains a cutting edge defined by the intersection of two planar cutting surfaces integrally formed and extending along the lower portion of the working section to enable the tool to be used to chop the earth.

In accordance with yet another aspect of the invention, the above tool is adapted to receive any of a plurality of implements to perform other functions. The implements are dimensioned so as to be removably attachable to the working section. The working section is dimensioned to provide structural support for and to receive each of the implements. The present invention also contemplates a means for removably fastening each of the implements to the working section to perform a selected function.

DESCRIPTION OF THE DRAWINGS

For a more complete understanding of the present invention and for further objects and advantages thereof, reference is now made to the following description taken in conjunction with the accompanying drawings in which:

FIG. 6 is a perspective view of the tool with a leaf rake attachement;

FIG. 7 is a perspective view of the tool with a cultivator attachment;

FIG. 8 is a perspective view of the tool with a spading fork attachment;

FIG. 9 is a perspective view of the tool with a squeegee attachment; and

FIG. 10 is a perspective view of the tool with a broom attachment.

DESCRIPTION OF THE PREFERRED EMBODIMENT

Figure 1:
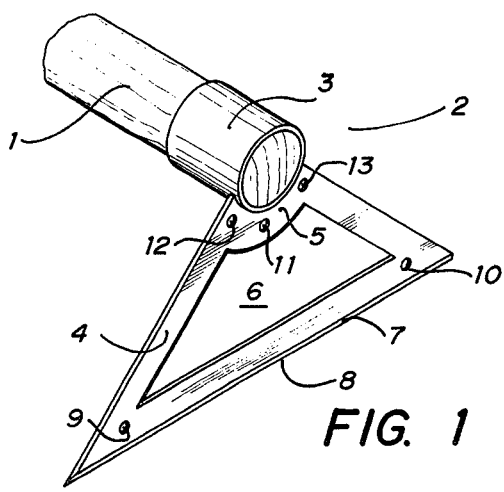
FIG. 1 is a perspective view of the improved hoe with the handle broken off and no implements attached.

FIG. 1 illustrates the preferred embodiment of the improved hoe used for chopping and scraping with no additional implements attached thereto. The hoe includes a rigid, elongated handle 1, ordinarily manufactured of wood, connected to a head 2 manufactured of metal, such as steel of the weight and like properties used in most farming tools. Head 2 includes a hollow cylindrical receiving portion 3, designed to receive handle 1. Receiving portion 3 is joined to a working section 4 by welding or the embodiment may be forged. Working section 4 has the shape of a truncated isosceles triangle defining an arcuate truncated portion 5 where working section 4 joins receiving portion 3. The working section 4 is mounted substantially perpendicular to the length of the handle 1, although a slight angle of 5°–10° between the working section 4 and the handle 1 can be used if desired. The arcuate truncated portion 5 has the same curvature as handle receiving portion 3, thus permitting working section 4 to be welded flush thereto. This arcuate weld provides greater structural support on the working section than is commonly found in conventional "goose neck" hoe connections.

Working section 4 defines a large aperture 6 which is geometrically similar to the outer periphery of working section 4. Aperture 6 has a greater width at its lower portion near the lower portion of the working section and is truncated in the region of the truncated portion 5 of the working section 4. Aperture 6 has sufficient width to permit the passage of soil therethrough when the implement is used to scrape soil. The aperture 6, however, is not as wide as many scraping implements known in the prior art, and thus provides a working section with substantial structural support around the edges of the aperture.

Figure 2:
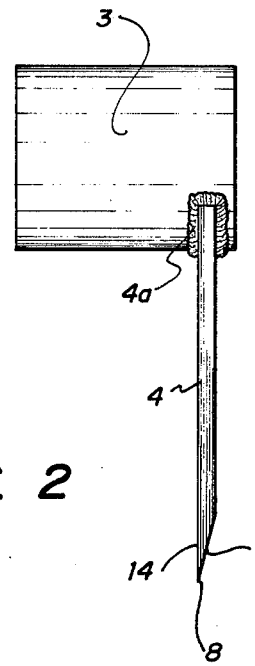
FIG. 2 is a side view of the improved hoe shown in FIG. 1.

As shown in FIG. 2, the lower portion of working section 4 defines two planar cutting surfaces. The outer surface 7 tapers to intersect an inner surface 14 to form cutting edge 8. Cutting edge 8 extends along the base of the working section 4, perpendicular to handle 1, and is generally disposed perpendicular to the plane of the topsoil when used. FIG. 2 also illustrates a portion of the arcuate weld 4a between the portion 3 and working section 4.

Definite structural advantages accrue from the design of the present working section configuration. For example, the heavy weight of the head in the present invention provides a distinct advantage over prior art hoe implements. A heavier head permits the tool to be applied to the earth with greater impact, thus enhancing the cutting and chopping of soil.

Another advantage of the present invention is inherent in the triangular design of the working section. The sharp angular edges of the base of the working section makes the hoe accessible to areas such as under low horizontal board fences, which rectangular configurations, such as the head of the ordinary hoe, are not. The triangular design also allows the operator to dig in behind small weeds, which grow in close proximity to the ground, and to then flip the weeds out.

Working section 4 also defines a number of small apertures 9–13 which are designed to register with apertures in attachable implements. Working section 4 contains a sufficient number of apertures to permit a variety of different implements to be attached, although not all such apertures are required to bolt each particular implement thereto.

Figure 3:
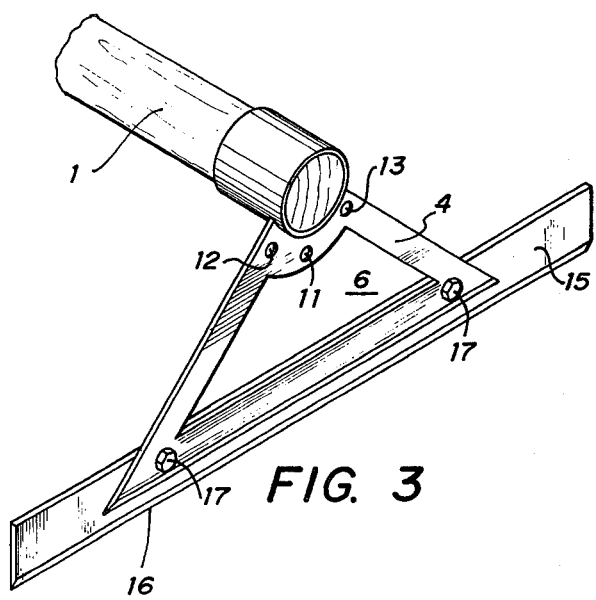
FIG. 3 is a perspective view of the tool with a cutting blade attached.

Referring to FIG. 3, a removable cutting blade 15 is attached to working section 4 by bolts extending through apertures 9 and 10. Cutting blade 15, like the lower portion of working section 4, comprises two planar cutting surfaces, the outer surface of which tapers to join the inner surface to define cutting edge 16. The cutting edge 16 has a substantially greater length than cutting surface 8 defined on the working section 4. Cutting blade 15 thus provides a larger cutting blade when the length of working section 4 is inadequate for a particular task. It can be manufactured of the same material as working section 4.

Cutting blade 15 may be attached to working section 4 by any of the variety of connecting devices. FIG. 3 indicates the use of hexbolts 17 which extend through apertures 9 and 10 in working section 4 and through mating apertures in blade 15. Suitable nuts are threadedly attached to the ends of bolts 17. Other bolting devices such as wingnuts 20, shown in FIG. 4, and allen screws 37, shown in FIG. 8, are likewise contemplated.

Figure 4:
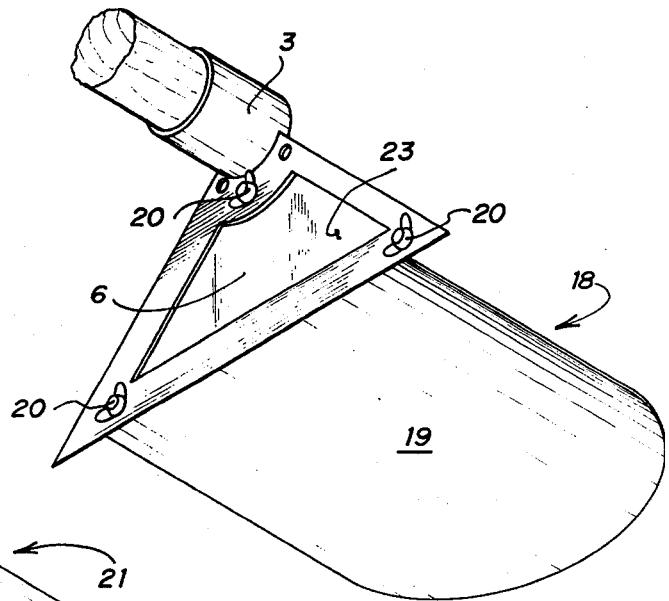
FIG. 4 is a perspective view from the bottom rear of the tool with a shovel spoon attached.
Figure 5:
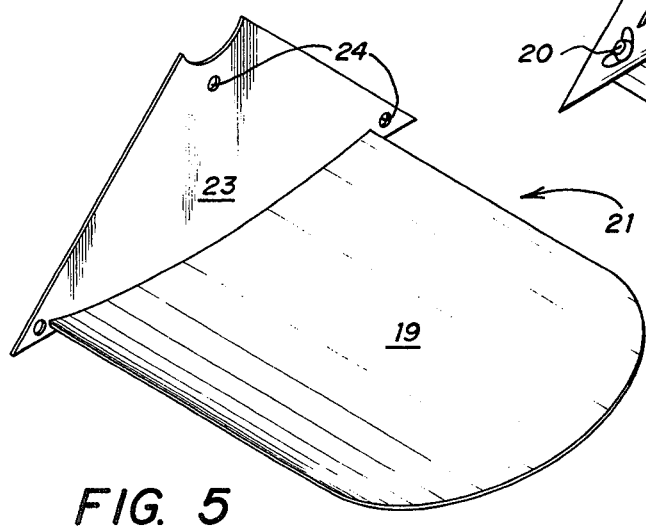
FIG. 5 is a perspective view of the shovel spoon attachment of FIG. 4 illustrating a solid attachment back.

Referring to FIGS. 4 and 5, an apertured shovel attachment 18 is shown removably bolted to working section 4. Attachment 18 includes a shovel spoon 19 manufactured of steel or other material which is integral with or welded to a perpendicular structural support 23 which is bolted to working section 4, support 23 with three wingnuts 20. The support 23 contains three small apertures 24 designed to register with apertures 9, 10 and 11 in working section 4. Wingnuts 20 may be covered with plastic caps, if desired, to prevent their sharp edges from causing injury to the operator, or the hazard can be circumvented altogether by using allen screws.

Shovel attachment 18 is especially well adapted for digging because of its structural support 23. With this attachment, the operator can place one foot on the working section 4 and apply his weight directly along the line of action of the shovel spoon, instead of from an angle as is done with the ordinary shovel. This permits greater penetration of the soil by the shovel spoon for a given amount of force applied by the operator.

As shown in FIG. 5, shovel implement 19 includes a perpendicular solid structural support 23. The solid support 23 prevents passage of material through the aperture 6, and facilitates retention and transfer of shoveled material in spoon 18. However, it will be understood that an aperture can be provided through support 23 which corresponds in shape with aperture 6.

Referring now to FIG. 6, the present invention also contemplates the attachment of rake heads to working section 4. FIG. 6 illustrates a leaf rake attachment 25 with flexible, resilient prongs 26 manufactured from a lightweight metal. Prongs 26 emanate from support means 28 which is welded to or integral with supporting structure 27. Supporting structure 27 defines an aperture dimensioned and shaped to correspond to the periphery of aperture 6 in working section 4 and is mounted to working section 4 by means of hexagonal bolts 17. Leaf rake attachment 25 is attached with bolts 17, although other attaching devices can be used. Not hown but also contemplated by the present invention are other rake attachments manufactured of more durable material, such as a bow rake or level head rake attachment.

Referring to FIG. 7, the present invention is illustrated with a cultivator attachment 31, comprising a series of curved pikes 32 joined to a supporting structure 33. Structure 33 is bolted to working section 4 by any of the above-described bolting devices. Pikes 32 are manufactured of steel or the like to provide sufficient strength to withstand the considerable stress to which a cultivator is normally subject.

FIG. 8 shows the present invention to which a fork attachment 34 has been bolted. Metal prongs 35 are joined to a supporting structure 36 which is bolted to working section 4 by means of allen screws 37. Prongs 35 may be rounded as in FIG. 8 or pointed, depending upon the purpose to be served.

FIG. 9 illustrates a squeegee 39 manufactured of rubber, plastic or leather designed to be bolted to working section 4 so that the device may be used to remove liquids from surfaces. The squeegee 39 includes a steel or plastic frame supporting the flexible wiping edge.

FIG. 10 shows an embodiment of the invention wherein a broom or brush attachment 40 may be bolted to working section 4. Flexible bristles 43 are cemented to a wood or plastic platform 41 which is integral with or attached to support structure 42. Depending upon the choice of fibers for the bristles, this embodiment may operate as broom or brush for a variety of purposes.

A suitable configuration of apertures in working section 4 may thus be selected for a particular device to provide optimal structural support. For example, the large cutting blade 15 and squeegee attachment 39 are bolted to the two apertures 9 and 10 in the lower portion of the working section as shown in FIGS. 3 and 9. The shovel attachments 18 and 21 shown in FIGS. 4 and 5 are bolted to the two apertures 9 and 10 along the base of working section 4 and to the middle aperture 11 in the truncated portion 5 of working section 4. The leaf rake attachment 26 shown in FIG. 6, for example, is best supported by bolting through apertures 9 and 10 along the lower portion of the working section 4 and through the outside apertures 12 and 13 in the truncated portion 5.

It will be obvious that this panoply of implements is not limited to rakes, shovels, forks, brooms, squeegees, cutting blades and the like, but could include any other hand implement to perform agriculatural and household functions. It will also be evident to one skilled in the art that the above described embodiments can be constructed in miniature to provide a set of small hand tools for use in the flower or vegetable garden.

Although particular embodiments of the invention have been described herein, it will be understood that the invention is not limited to the embodiments disclosed, but is capable of rearrangement, modification and substitution of parts and elements without departing from the spirit of the invention.

What is claimed is:

1. An improved hoe for scraping and chopping soil and capable of having an implement selectively mounted thereto comprising:
    an elongated rigid handle;
    a head having a portion dimensioned to receive the end of said handle and including a working section disposed generally normal to the length of said handle and having the shape of a truncated isosceles triangle, said working section also defining an aperture therethrough having boundaries geometrically similar in shape to the outer periphery of said working section, said aperture having sufficient width to permit the passage of earth therethrough when the hoe is used for scraping; and
    a chopping edge defined by the intersection of two planar cutting surfaces integrally formed and extending along the lower portion of said working section, said cutting surfaces on said working section disposed such that said chopping edge is applied substantially normally to the earth when the tool is used for chopping;
    an implement constructed for being removably attached to said working section, said working section dimensioned to provide structural support for and to receive said implement; and
    means for removably fastening said implement to said working section to perform a selected function.

2. The improved hoe as defined in claim 1 wherein said implement comprises a shovel spoon dimensioned to be fastened substantially perpendicular to said working section to enable shoveling to be accomplished by the tool.

3. The improved hoe as defined in claim 1 wherein said implement comprises a spade spoon dimensioned to be fastened substantially perpendicular to said working section to enable spading to be accomplished by the tool.

4. The improved hoe as defined in claim 1 wherein said implement comprises a snow shovel spoon dimensioned to be fastened substantially perpendicular to said working section to enable snow shoveling to be accomplished by the tool.

5. The improved hoe as defined in claim 1 wherein said implement comprises a leaf rake attachment dimensioned to be fastened substantially perpendicular to said working section to enable raking to be accomplished by the tool.

6. The improved hoe as defined in claim 1 wherein said implement comprises a bow head rake attachment dimensioned to be fastened to said working section to enable raking to be accomplished by the tool.

7. The improved hoe as defined in claim 1 wherein said implement comprises a level head rake attachment dimensioned to be fastened to said working section to enable raking to be accomplished.

8. The improved hoe as defined in claim 1 wherein said implement comprises a broom attachment dimensioned to be fastened to said working section to enable sweeping to be accomplished.

9. The improved hoe as defined in claim 1 wherein said implement is a squeegee attachment dimensioned to be fastened to said working section to enable the removal of liquid from a surface to be accomplished.

10. The improved hoe as defined in claim 1 wherein said implement comprises a cultivator attachment dimensioned to be fastened to said working section to enable cultivation to be accomplished by the tool.

11. The improved hoe as defined in claim 1 wherein said implement comprises a spading fork attachment dimensioned to be fastened to said working section to enable forking to be accomplished by the tool.

12. The improved hoe as defined in claim 1 wherein said implement is an edger attachment dimensioned to be fastened to said working section to enable edging to be accomplished by said tool.

13. The improved hoe as defined in claim 1 wherein said implement is a rotary shear attachment dimensioned to be fastened to said forking section to enable shearing to be accomplished by the tool.

14. The improved hoe as defined in claim 1 wherein said implement is a large cutting blade attachment of substantially greater length than the base of said working section and dimensioned to be fastened to said working section to enable cutting and chopping to be accomplished by the tool.

* * * * *